United States Patent
Kaske et al.

(10) Patent No.: US 12,184,042 B2
(45) Date of Patent: Dec. 31, 2024

(54) ECONOMICAL PRE-CHAMBER SPARK PLUG

(71) Applicant: Robert Bosch GmbH, Stuttgart (DE)

(72) Inventors: Stephan Kaske, Sternenfels Diefenbach (DE); Alexander Schramm, Knetzgau (DE); Andreas Benz, Bamberg (DE); Matthias Blankmeister, Heiligenhaus (DE); Anatolij Odegov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/044,036

(22) PCT Filed: Jul. 13, 2021

(86) PCT No.: PCT/EP2021/069514
§ 371 (c)(1),
(2) Date: Mar. 3, 2023

(87) PCT Pub. No.: WO2022/053203
PCT Pub. Date: Mar. 17, 2022

(65) Prior Publication Data
US 2023/0318264 A1    Oct. 5, 2023

(30) Foreign Application Priority Data
Sep. 10, 2020   (DE) .................. 10 2020 211 356.4

(51) Int. Cl.
*H01T 13/39* (2006.01)
*H01T 13/32* (2006.01)
*H01T 13/54* (2006.01)

(52) U.S. Cl.
CPC ............. *H01T 13/39* (2013.01); *H01T 13/32* (2013.01); *H01T 13/54* (2013.01)

(58) Field of Classification Search
CPC .......... H01T 13/39; H01T 13/32; H01T 13/54
See application file for complete search history.

(56) References Cited

U.S. PATENT DOCUMENTS

| 9,929,540 B1 | 3/2018 | Boll et al. |
| 10,666,022 B2 | 5/2020 | Shibata |

(Continued)

FOREIGN PATENT DOCUMENTS

| DE | 44 14 545 A1 | 11/1994 |
| DE | 10 2012 202 335 A1 | 8/2013 |

(Continued)

OTHER PUBLICATIONS

International Search Report corresponding to PCT Application No. PCT/EP2021/069514, mailed Oct. 15, 2021 (German and English language document) (6 pages).

*Primary Examiner* — Fatima N Farokhrooz
(74) *Attorney, Agent, or Firm* — Maginot, Moore & Beck LLP

(57) ABSTRACT

A pre-chamber spark plug includes (i) a middle electrode with a first noble metal body which has a first end spark face, (ii) a ground electrode with a second noble metal body which has a second end spark face, (iii) a housing, with the ground electrode being fixed in the housing, (iv) an insulator which electrically insulates the middle electrode with respect to the ground electrode, and (v) a cap, which together with a part of the housing, defines a pre-chamber. The first end spark face and the second end spark face are arranged oppositely at a distance from one another.

12 Claims, 10 Drawing Sheets

(56) References Cited

U.S. PATENT DOCUMENTS

| | | | | |
|---|---|---|---|---|
| 2003/0071552 | A1* | 4/2003 | Teramura | H01T 13/39 |
| | | | | 313/143 |
| 2006/0181185 | A1* | 8/2006 | Yamanaka | H01T 13/32 |
| | | | | 313/144 |
| 2007/0290592 | A1* | 12/2007 | Lykowski | H01T 13/39 |
| | | | | 313/141 |
| 2009/0289540 | A1* | 11/2009 | Nunome | H01T 13/32 |
| | | | | 313/141 |
| 2011/0043093 | A1* | 2/2011 | Nunome | H01T 13/39 |
| | | | | 313/141 |
| 2011/0215702 | A1* | 9/2011 | Kameda | H01T 13/467 |
| | | | | 313/141 |
| 2013/0002122 | A1* | 1/2013 | Kowalski | H01T 21/02 |
| | | | | 445/3 |
| 2013/0313960 | A1 | 11/2013 | Francesconi | |
| 2014/0196684 | A1* | 7/2014 | Kraus | H01T 13/467 |
| | | | | 313/140 |
| 2014/0292178 | A1* | 10/2014 | Hartmann | H01T 13/39 |
| | | | | 445/7 |
| 2017/0288373 | A1* | 10/2017 | Araya | H01T 21/02 |
| 2018/0062357 | A1* | 3/2018 | Akiyoshi | H01T 13/34 |

FOREIGN PATENT DOCUMENTS

| | | | | |
|---|---|---|---|---|
| DE | 102014004943 A1 * | 2/2015 | | F02B 19/12 |
| DE | 102017107679 A1 * | 10/2018 | | F02B 19/1004 |
| DE | 102018101512 A1 * | 7/2019 | | B22F 3/225 |
| DE | 10 2019 115 735 A1 | 1/2020 | | |
| EP | 2 815 472 B1 | 3/2019 | | |
| JP | 2018107110 A * | 7/2018 | | H01T 13/20 |
| WO | WO-2013045145 A1 * | 4/2013 | | H01T 13/20 |

\* cited by examiner

ECONOMICAL PRE-CHAMBER SPARK PLUG

This application is a 35 U.S.C. § 371 National Stage Application of PCT/EP2021/069514, filed on Jul. 13, 2021, which claims the benefit of priority to Serial No. DE 10 2020 211 356.4, filed on Sep. 10, 2020 in Germany, the disclosures of which are incorporated herein by reference in their entirety.

BACKGROUND

The present disclosure relates to a pre-chamber spark plug, in particular for automotive applications, having two noble metal bodies arranged with their end sides facing opposite one another.

Pre-chamber spark plugs for gas combustion engines are typically used in large stationary systems. With these spark plugs, the service life of the pre-chamber spark plug is a critical financial and technical parameter. However, spark plugs for mobile combustion engines must be as economical as possible and in particular also suitable for mass production. In order to meet the required service lives, noble metal wear faces are typically used on the middle electrode, but these significantly increase the cost of such pre-chamber spark plugs.

SUMMARY

By contrast, the pre-chamber spark plug according to the disclosure, having the features described herein, offers the advantage that a simple and economical mass production is possible. As a result, the pre-chamber spark plug according to the present disclosure is suitable for use in stationary combustion engines, as well as in automotive applications containing mobile combustion engines. The pre-chamber spark plug according to the disclosure comprises two noble metal bodies, namely a first noble metal body on the middle electrode and a second noble metal body on the ground electrode. The ground electrode is fixed in a housing, and an insulator electrically insulates the middle electrode against the ground electrode. Further, a cap is provided, which together with a part of the housing defines a pre-chamber of the pre-chamber spark plug. The two noble metal bodies each have end spark faces that are parallel to one another and arranged oppositely at a distance from one another in the pre-chamber so as to generate an ignition spark between them in operation.

Further developments of the disclosure are set forth below.

Particularly preferably, the first noble metal body is arranged laterally on the middle electrode. A simple fixing of the first noble metal body to the middle electrode can thus be enabled. In particular, the first end spark face is parallel to the center axis of the pre-chamber spark plug. Further, the second noble metal body is preferably arranged at a right angle to a center axis of the pre-chamber spark plug. Thus, the second spark face of the second noble metal body is arranged perpendicular to the center axis of the pre-chamber spark plug.

According to an alternative embodiment of the disclosure, the first noble metal body is arranged in a lateral blind hole in the middle electrode. Alternatively, the first noble metal body is arranged on a flat section of the middle electrode oriented in the direction of the ground electrode.

Preferably, the middle electrode has a lateral flat section to which the retaining element is attached. The first noble metal body is then arranged laterally on the retaining element. Preferably, the flat section is arranged at the free end of the middle electrode.

According to a further preferred alternative embodiment of the disclosure, the second noble metal body is arranged on a flat section on the ground electrode, and the first noble metal body is arranged on an end side of the middle electrode. The flat section is preferably arranged at the free end of the ground electrode.

The noble metal bodies are preferably connected to the respective electrodes by soldering or welding or by a compression joint.

According to a further preferred configuration of the disclosure, the middle electrode has on its end side a slope to which the first noble metal body is arranged. The ground electrode, where the second noble metal body is arranged on the end side, is then preferably arranged at an angle to the center axis of the pre-chamber spark plug, such that the spark faces of the two noble metal bodies of the middle electrode and the ground electrode lie opposite one another. The angle is preferably selected in a range between 30° to 60° and is particularly preferably 45°. As a result, a particularly simple and economical production can be enabled.

Preferably, the first noble metal body is arranged on a retaining element, which is fixed to the middle electrode. Further preferably, the retaining element is laterally fixed to the middle electrode. The retaining element is preferably made of a nickel-containing material.

Alternatively, the retaining element is arranged on an end side of the middle electrode, and the first noble metal body is then fixed laterally to the retaining element.

According to a particularly preferred configuration of the disclosure, the retaining element is a ring of a middle opening, to which the retaining element is fixed on the middle electrode. The first noble metal body is arranged laterally on the ring.

Particularly preferably, the ring comprises a lateral flat section to which the first noble metal body is attached. Further, the middle electrode preferably comprises a shoulder on which the annular retaining element is arranged. A predefined, secure fixing of the retaining element is thus possible. The annular retaining element on the opening further alternatively or additionally comprises a shoulder with which a secure placement for a fixing of the retaining element on the middle electrode is possible.

According to a further preferred configuration of the disclosure, the retaining element is arcuate, in particular with a 90° arc, wherein the first noble metal body is arranged on the end side of the arc. Preferably, the arcuate retaining element tapers in the direction of the free end, e.g. incrementally or continuously. This allows for easy bending.

Further preferably, the first and second noble metal bodies are configured identically, in particular as a cylindrical pin.

According to a further preferred configuration of the disclosure, the noble metal body is itself arcuate and fixed to an end side of the middle electrode, which is perpendicular to the center axis of the pre-chamber spark plug. The first noble metal body is preferably a 90° arc. The first noble metal body is preferably made of a wire with a diameter in the range between 0.5 mm and 2 mm.

Preferably, the first end spark face of the middle electrode and the second end spark face of the ground electrode are arranged obliquely to the center axis X-X of the pre-chamber spark plug. Thus, the spark faces are arranged as slopes towards the center axis. The ground electrode is preferably arranged perpendicular to the center axis X-X. This configuration can in particular reduce an axial length of the pre-chamber spark plug.

Particularly preferably, the slope is formed on the first noble metal body of the middle electrode, and a second slope is formed on the second noble metal body of the ground electrode. Alternatively, the first and second noble metal bodies of the middle electrode and the ground electrode are cylindrical, and the slopes are arranged on the middle electrode and the ground electrode, respectively.

Further, the present disclosure relates to a combustion engine having a pre-chamber spark plug according to the present disclosure, in particular for automotive applications.

BRIEF DESCRIPTION OF THE DRAWINGS

Preferred embodiment examples of the disclosure are described in detail below with reference to the accompanying drawing. The drawing shows.

DETAILED DESCRIPTION

Figure 1:
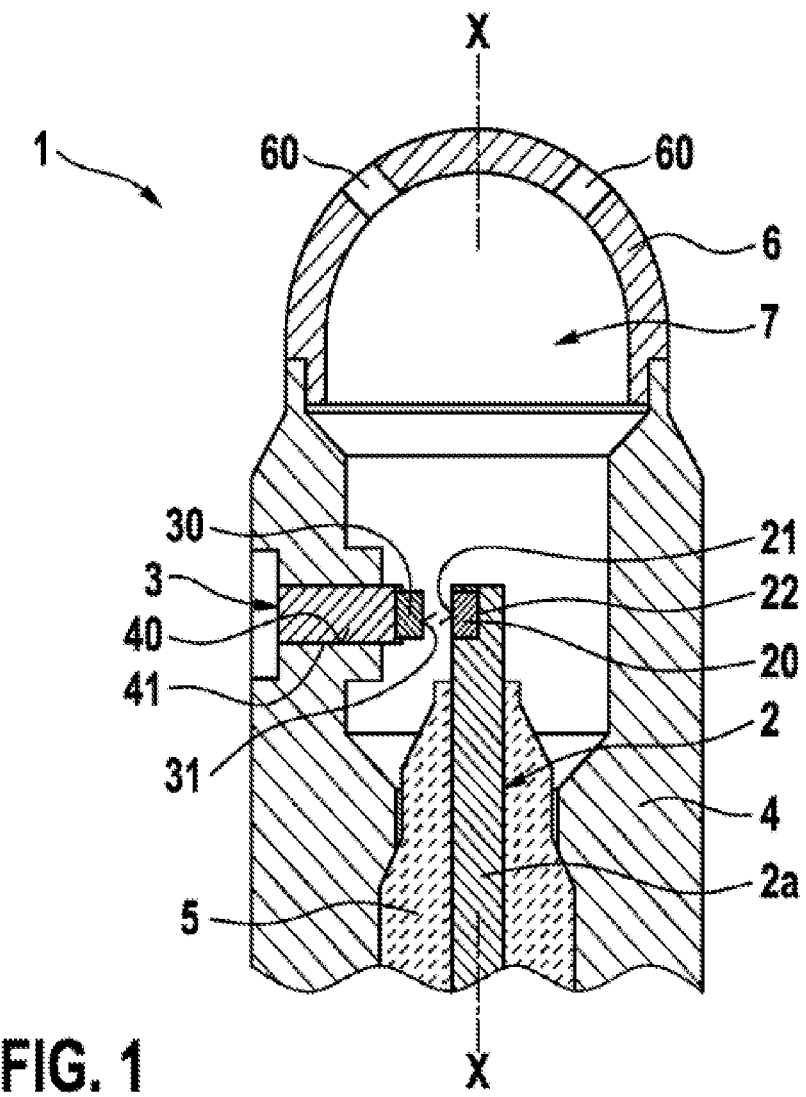
FIG. 1 a schematic sectional view of a pre-chamber spark plug according to a first preferred embodiment example of the disclosure, FIG. 2 a schematic sectional view of a pre-chamber spark plug according to a second preferred embodiment example of the disclosure, FIG. 3 a schematic, perspective partial sectional view of the pre-chamber spark plug of FIG. 2, FIG. 4 a schematic sectional view of a pre-chamber spark plug according to a third preferred embodiment example of the disclosure, FIG. 5 a schematic, perspective partial sectional view of FIG. 4, FIG. 6 a schematic sectional view of a pre-chamber spark plug according to a fourth preferred embodiment example of the disclosure, FIG. 7 a schematic sectional view of a pre-chamber spark plug according to a fifth preferred embodiment example of the disclosure.

Referring now to FIG. 1, a pre-chamber spark plug 1 according to a first preferred embodiment example of the disclosure will be described in detail.

As can be seen from FIG. 1, the pre-chamber spark plug 1 comprises a middle electrode 2 and a ground electrode 3. The middle electrode 2 lies in a center axis X-X of the pre-chamber spark plug 1.

The middle electrode 2 comprises a first noble metal body 20, which is for example a cylinder. The first noble metal body 20 has a first end spark face 21. The first noble metal body 20 is arranged in a blind hole 22 in the middle electrode base body 2a. The first noble metal body 20 can be fixed to the middle electrode base body 2a, for example by means of welding or a press fit.

The ground electrode 3 comprises a second noble metal body 30. As can be seen from FIG. 1, the second noble metal body 30 is fixed to an end side of the ground electrode 3, preferably also by means of welding. A second end spark face 31 of the second noble metal body 30 lies parallel to the first end spark face 21 of the first noble metal body 20.

As can be seen from FIG. 1, the two spark faces 21, 31 are arranged parallel to the center axis X-X of the pre-chamber spark plug 1.

The pre-chamber spark plug 1 further comprises a housing 4, an insulator 5, and a cap 6. As can be seen from FIG. 1, a part of the housing 4 and the cap 6 define a pre-chamber 7 of the pre-chamber spark plug, in which the middle electrode 2 and the ground electrode 3 are arranged for the purpose of spark generation.

Multiple cap holes 60 are provided in the cap 6 for supplying an ignited gas mixture through the cap holes into a combustion chamber of a combustion engine and for triggering a main ignition therein of the gas mixture located in the combustion chamber.

The housing 4 comprises a through-opening 40 in which the ground electrode 3 is fixed, e.g. by means of a press fit 41. Alternatively, the ground electrode can also be connected to the housing 4 by means of welding.

As can now be seen from FIG. 1, the two end spark faces 21, 31 lie parallel to the center axis X-X oppositely at a predetermined distance to one another. The first noble metal body 20 is arranged laterally on the middle electrode 2. The second noble metal body 30 is arranged at the end side on the ground electrode 3. The ground electrode 3 is fixed at a 90° angle to the center axis X-X in the housing 4.

The first noble metal body 20 is radially welded into the blind hole 22. It should be noted, however, that it is also possible that the first noble metal body 20 is completely melted and is alloyed with the base material of the middle electrode 2 at the transition region of the two materials, whereby a high-grade metal-containing region is present at the middle electrode 2, in which direction the ground electrode 3 is oriented.

In this embodiment, however, the first and second noble metal bodies 20, 30 are cylindrical bodies (pins), which preferably have identical dimensions. As a result, a mass production can be further economized.

Thus, a pre-chamber spark plug 1 can be provided, which has reduced wear due to the use of the two noble metal bodies 20, 30, wherein the necessary noble metal volume is still minimized and the pre-chamber spark plug can thus be provided very economically.

Figure 2:
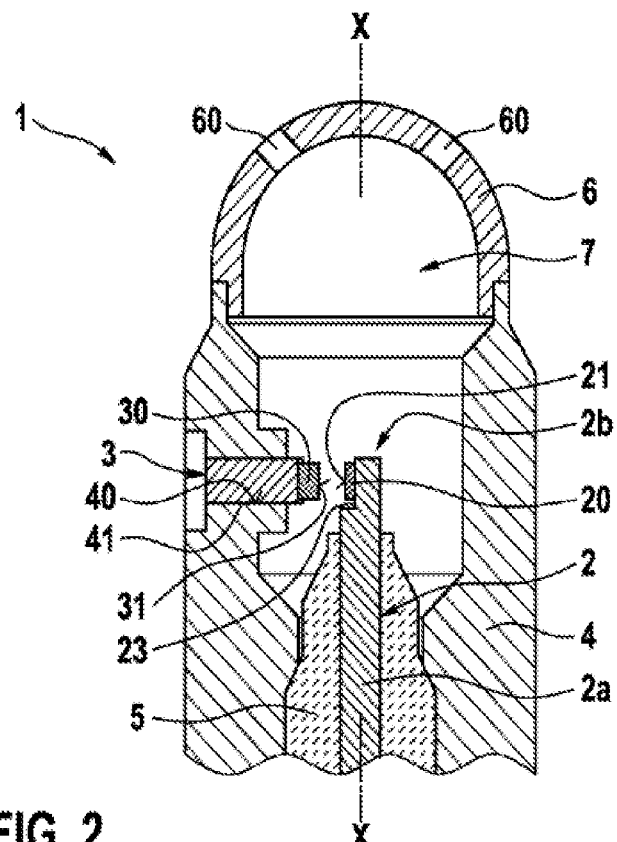
Figure 3:
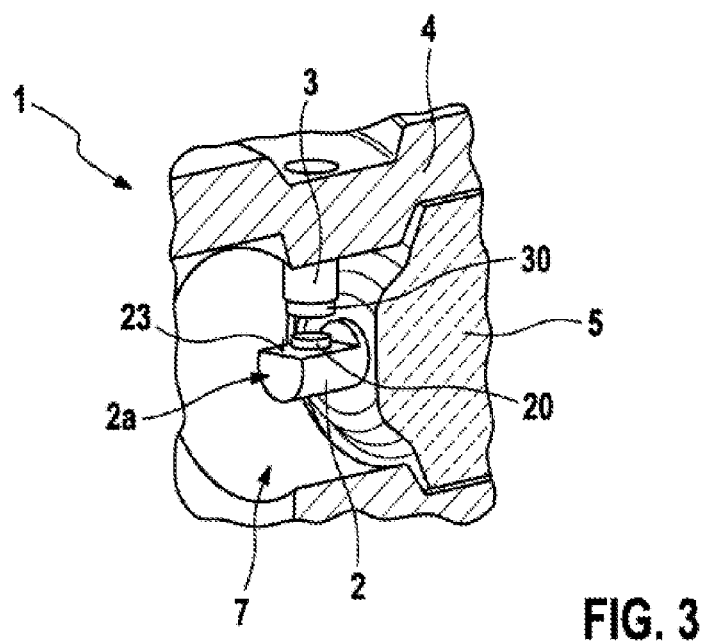

FIGS. 2 and 3 show a pre-chamber spark plug 1 according to a second preferred embodiment example of the disclosure. Identical or functionally identical parts bear the same reference numbers as in the first embodiment example.

As can be seen from FIGS. 2 and 3, by contrast to the first embodiment example, the middle electrode 2 of the second embodiment example comprises a lateral flat section 23 on the outer circumference of the free end of the middle electrode. As can be seen from FIGS. 2 and 3, the flat section 23 is provided at a position of the middle electrode 2, which is oriented in the direction of the ground electrode 3. The first noble metal body 20 is arranged on the flat section 23. This can be done, for example, by means of welding the first noble metal body 20, which is also cylindrical in this embodiment example, to the flat section 23. The first noble metal body 20 is thus arranged laterally on the middle electrode 2. The two end spark faces 21, 31 of the middle and ground electrodes lie oppositely at a predetermined distance from one another and are parallel to the center axis X-X. The flat section 23 is provided at the free end 2b of the middle electrode 2. At the flat section 23, approximately one third of the diameter of the middle electrode material is removed. The first noble metal body is still within an envelope of the originally cylindrical middle electrode.

A particularly compact pre-chamber spark plug 1 can thus be produced, which can in particular have a reduced outer diameter, because the first noble metal body 20 is arranged inside an envelope of the middle electrode 2, which is preferably cylindrical.

Figure 4:
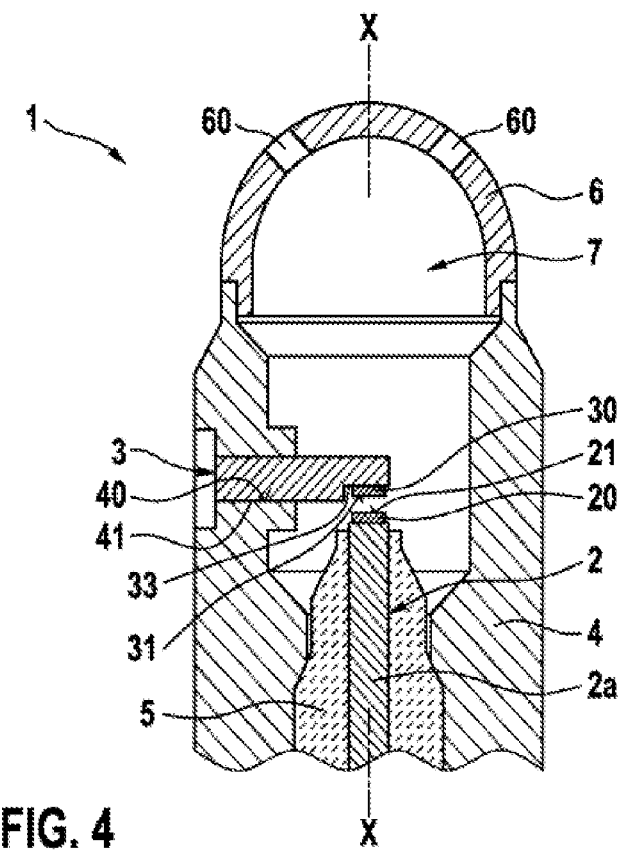
Figure 5:
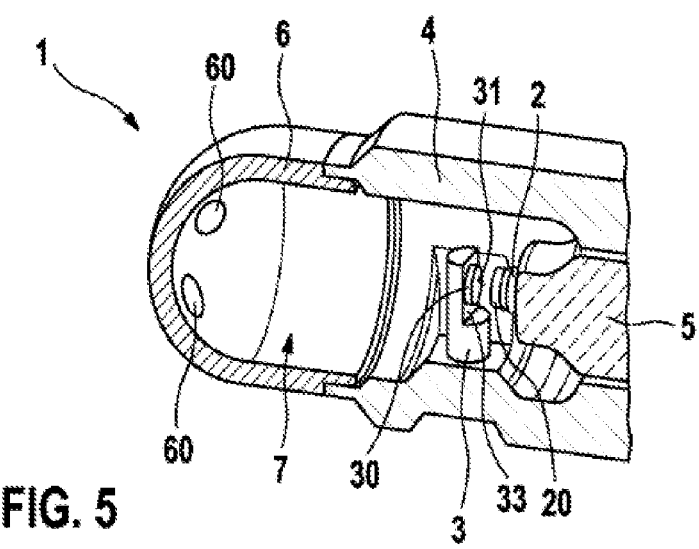

FIGS. 4 and 5 show a pre-chamber spark plug 1 according to a third embodiment example of the disclosure. Identical or functionally identical parts bear the same reference numbers as in the first embodiment example.

By contrast to the second embodiment example, in the third embodiment example, a lateral flat section 33 is provided at the free end of the ground electrode 3, to which the second noble metal body 30 is fixed (cf. FIG. 4). The first noble metal body 20 is fixed to an end side of the middle electrode 2. Thus, the first end spark face 21 of the first noble metal body 20 and the second end spark face 31 of the second noble metal body 30 are arranged perpendicular to the center axis X-X of the pre-chamber spark plug 1. With this arrangement, the end spark faces 21, 31 also face one another in parallel and provide a very compact and space-saving construction of the pre-chamber spark plug 1. In this case, approximately one third of the ground electrode material for the flat section 33 is also removed, and the second noble metal body is located within the original envelope of the ground electrode.

Figure 6:
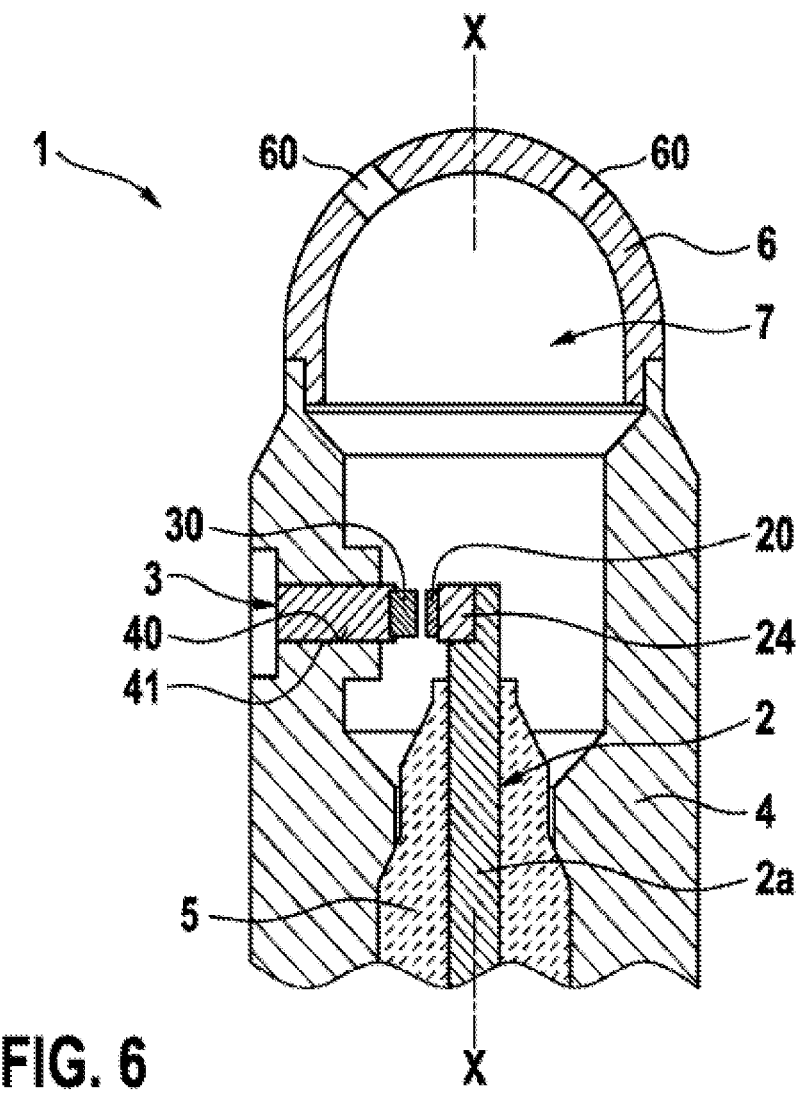

FIG. 6 shows a pre-chamber spark plug 1 according to a fourth embodiment example of the disclosure. Identical or functionally identical parts bear the same reference numbers as in the preceding embodiment example.

As can be seen from FIG. 6, in the fourth embodiment example, the first noble metal body 20 is fixed to a retaining element 24. The retaining element 24 is in turn fixed laterally to the middle electrode 2. For this purpose, a lateral flat section similar to the second embodiment example can be provided on the middle electrode 2, or, as shown in FIG. 6, the retaining element 24 is arranged in a recess in the form of a blind hole or the like on the middle electrode 2. In particular, this embodiment offers the advantage that the first noble metal body 20 can be applied precisely to the retaining element 24 outside the spark plug in a first step. In a next step, the retaining element 24 is then connected to the middle electrode 2 by means of welding, for example. Thus, in the fourth embodiment example, the first noble metal body 20 is also arranged laterally on the middle electrode 2, wherein however the retaining element 24 is positioned between them. The retaining element 24 is arranged at or near the free end 2b of the middle electrode 2.

Figure 7:
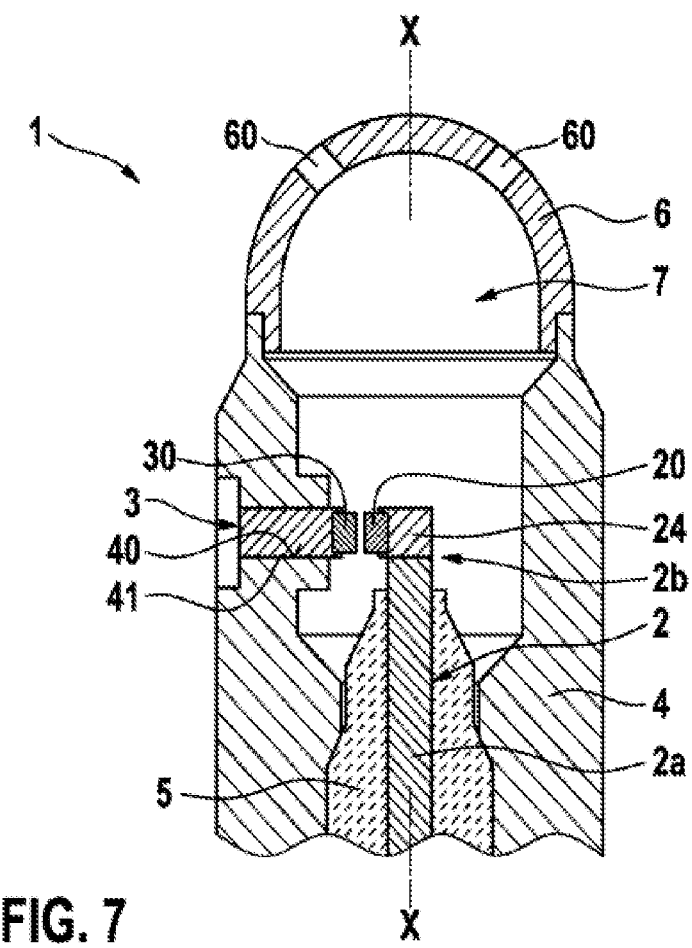

FIG. 7 shows a pre-chamber spark plug 1 according to a fifth embodiment example of the disclosure. Identical or functionally identical parts bear the same reference numbers as in the preceding embodiment examples.

As can be seen from FIG. 7, the fifth embodiment example substantially corresponds to the fourth embodiment example, wherein the first noble metal body 20 is again fixed to a retaining element 24. However, in the fifth embodiment example, the retaining element 24 is arranged on an end side of the free end 2b of the middle electrode 2. In this way, a lateral arrangement of the first noble metal body 20 towards the ground electrode 3 can also be realized.

Regarding the fourth and fifth embodiment examples, it is to be noted that the material of the retaining element 24 is preferably the same as for the middle electrode base body 2a. A geometrical shape of the retaining element 24 can be freely chosen, but is preferably a cylinder. If the materials for the retaining element 24 and the middle electrode 2 are selected to be identical, the retaining element 24 is preferably fixed to the middle electrode 2 by means of resistance welding.

Figure 8:
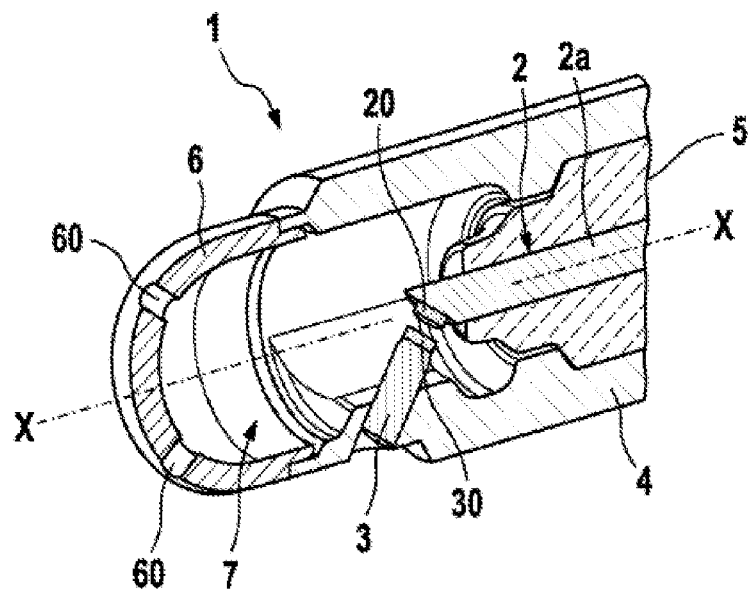
FIG. 8 is a schematic, perspective, sectional view of a pre-chamber spark plug according to a sixth preferred embodiment example of the disclosure, and FIG. 9 a schematic sectional view of the pre-chamber spark plug of FIG. 8, FIG. 10 a schematic sectional view of a pre-chamber spark plug according to a seventh preferred embodiment example of the disclosure, FIG. 11 a top plan view of the middle electrode of FIG. 10, FIG. 12 a schematic sectional view of a pre-chamber spark plug according to an eighth preferred embodiment example of the disclosure, FIG. 13 a schematic sectional view of a pre-chamber spark plug according to a ninth preferred embodiment example of the disclosure, FIG. 14 a schematic sectional view of a pre-chamber spark plug according to a tenth preferred embodiment example of the disclosure, and FIG. 15 a schematic sectional view of a pre-chamber spark plug according to an eleventh preferred embodiment example of the disclosure.
Figure 9:
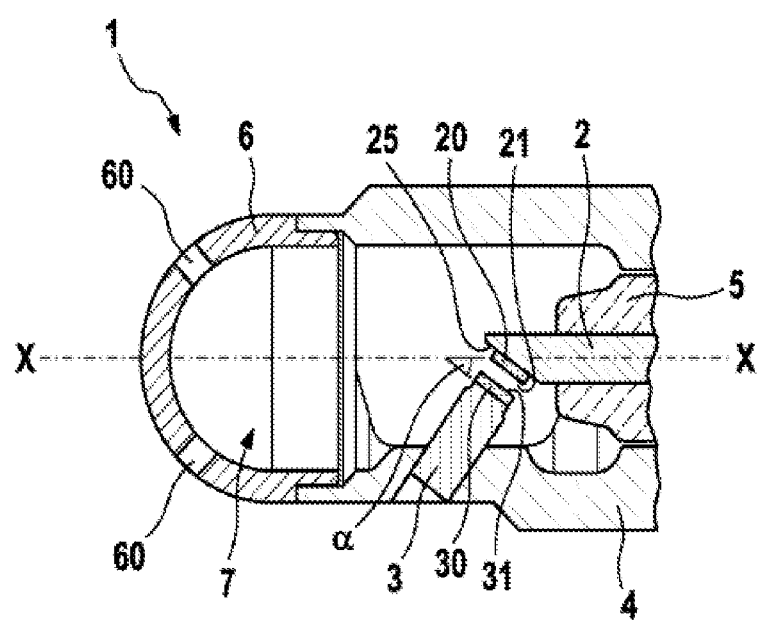

FIGS. 8 and 9 show a pre-chamber spark plug 1 according to a sixth embodiment example of the disclosure. Identical or functionally identical parts again bear the same reference numbers as in the preceding embodiment examples.

As can be seen from FIGS. 8 and 9, the first noble metal body 20 and the second noble metal body 30 of the pre-chamber spark plug are arranged on the middle electrode 2 and the ground electrode 3, respectively, in such a way that the end spark faces 21, 31 are arranged at an angle $\alpha$ to the center axis X-X of the pre-chamber spark plug. The angle $\alpha$ of this embodiment example is 45°. However, it should be noted that the angle $\alpha$ can also be selected differently, but is always an acute angle.

As can be seen from FIG. 9, the front end of the middle electrode 2 is defined by a slope 25 on which the first noble metal body 20 is fixed. The slope 25 is likewise arranged at a 45° angle to the center axis X-X. In this embodiment example, the ground electrode 3 is also arranged at an angle to the center axis X-X corresponding to the angle of the slope 25 to the center axis X-X. This arrangement can in particular reduce an axial length of the pre-chamber spark plug 1. As a result, a size of the pre-chamber 7 can also be increased or the cap 6 can be made smaller. Otherwise, this embodiment example corresponds to the preceding embodiment examples, so that reference can be made to the description given therein.

Figure 10:
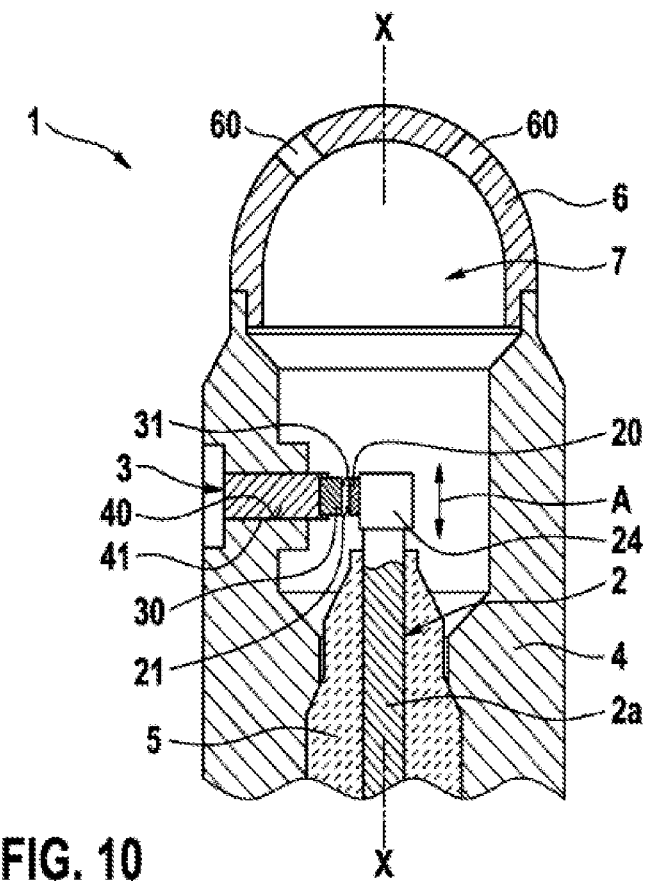
Figure 11:
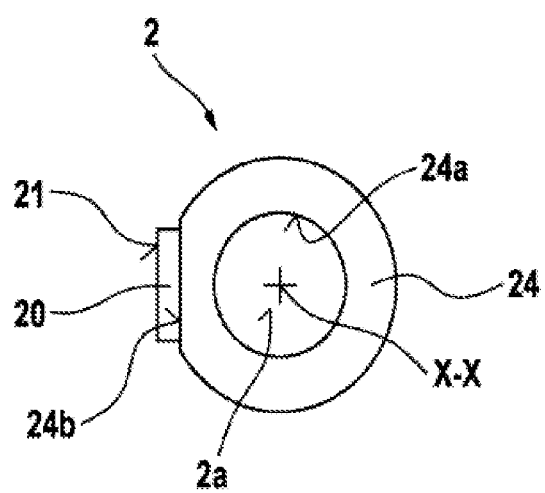

FIGS. 10 and 11 show a pre-chamber spark plug 1 according to a seventh embodiment example of the disclosure. Identical or functionally identical parts again bear the same reference numbers as in the first embodiment examples.

The seventh embodiment example in turn comprises a retaining element 24, which in this embodiment example is configured as a ring with an opening 24a. FIG. 11 shows a top plan view of the middle electrode 2. Preferably, a diameter of the opening 24a corresponds to an outer diameter of the middle electrode base region 2a. As a result, an axial arrangement of the retaining element 24 can be varied, as indicated in FIG. 10 by the double arrow A. In particular, tolerances can thus be compensated so that the two end spark faces 21, 31 of the middle electrode 2 and the ground electrode 3 lie opposite one another in the desired manner. After the retaining element 24 has been aligned, the retaining element 24 can then be fixed to the middle electrode base body by means of a welding procedure, for example.

The material of the retaining element 24 is preferably the same as the material of the middle electrode base body, such that, for example, a resistance welding can be used for fixing.

As can be seen further from FIG. 11, a flat section 24b on the outer circumference is provided on the annular retaining elements 24, to which the first noble metal body 20 is fixed. It should be noted that a shoulder is preferably present on the middle electrode 2, upon which the annular retaining element 24 is placed. This in particular also simplifies an orientation in the circumferential direction, because the annular retaining element 24 can be simply rotated onto the shoulder and then fixed. At the same time, the shoulder also allows a guided movement in the direction of the center axis X-X (axial direction). In addition to a welded connection, the retaining element 24 can also be fixed to the middle electrode base body 2a, for example by a press fit.

Figure 12:
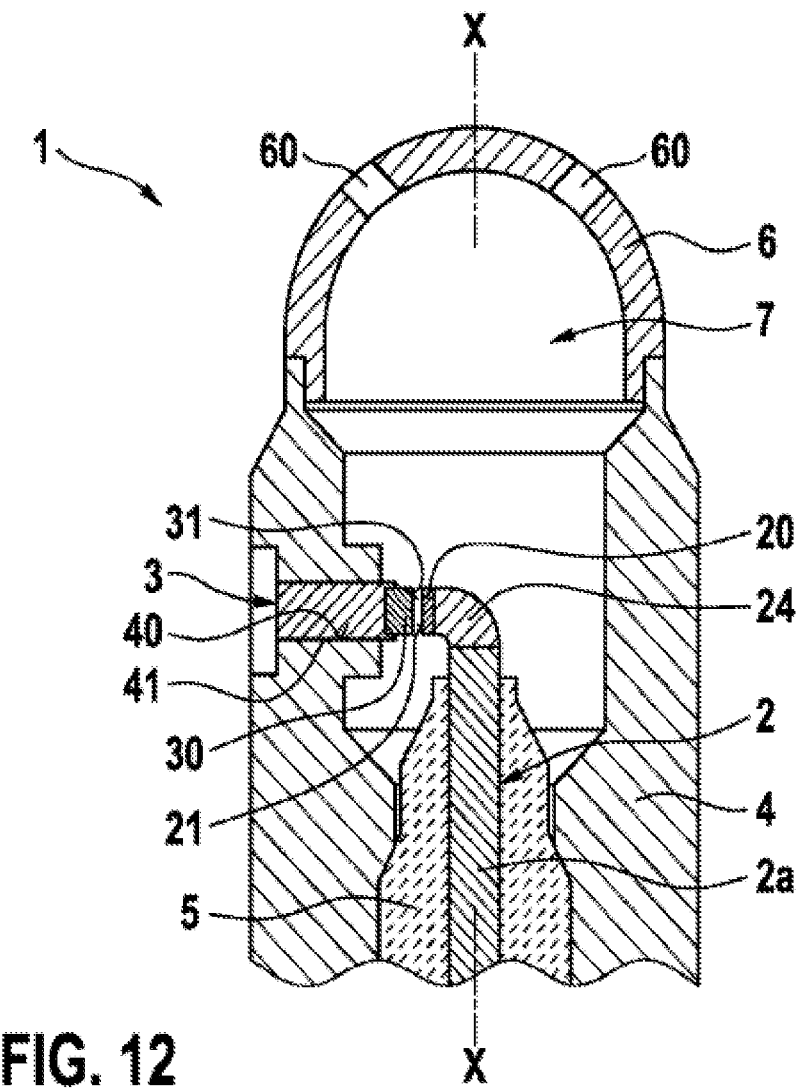

FIG. 12 shows a pre-chamber spark plug 1 according to an eighth embodiment example of the disclosure. Identical or functionally identical parts bear the same reference numbers as in the preceding embodiment examples. As can be seen from FIG. 12, in the eighth embodiment example, an arcuate retaining element 24 is welded onto an end side of the middle electrode 2. The retaining element 24 has a geometrical shape of a 90° arc. The first noble metal body 20 is fixed to the free end side of the 90° arc, preferably by way of a weld connection. The two spark faces 21, 31 of the noble metal bodies 20, 30 thus lie opposite one another again in order to generate an ignition spark between them. It should be noted that the middle electrode base body 2a can also be bent.

Figure 13:
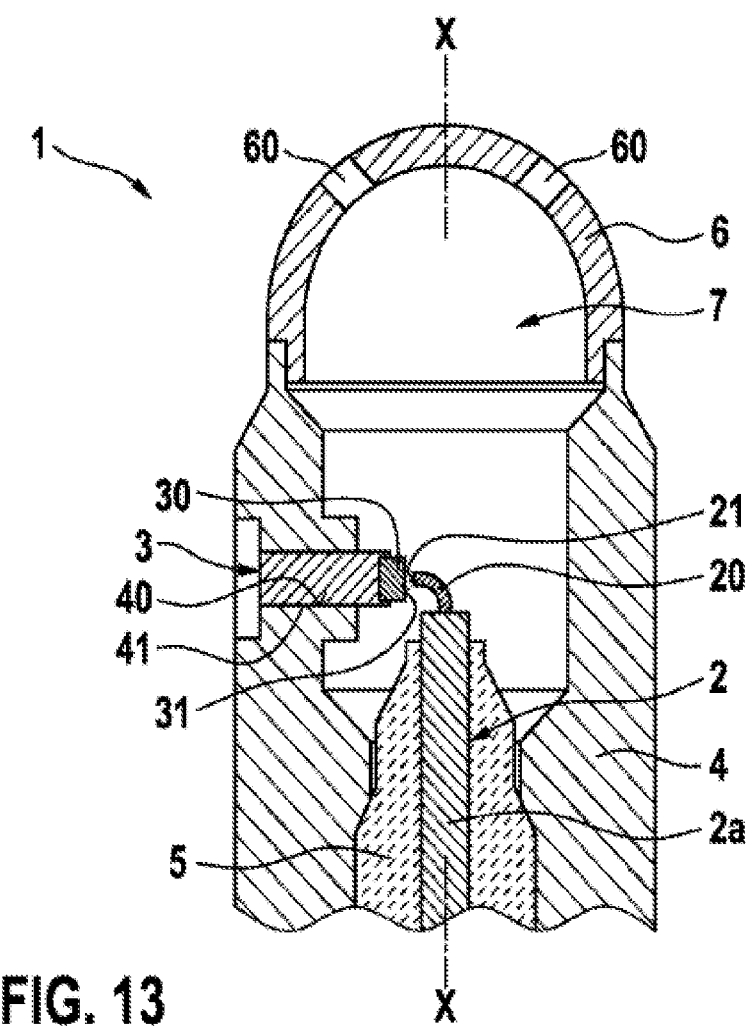

FIG. 13 shows a pre-chamber spark plug 1 according to a ninth embodiment example of the disclosure. Identical or functionally identical parts again bear the same reference numbers. The ninth embodiment example is similar to the eighth embodiment example, but a first noble metal body 20 is directly embodied as a 90° arc instead of as a retaining element 24. The first noble metal body 20 is welded to the end side of the middle electrode 2. This design also causes the spark faces 21, 31 of the two noble metal bodies 20, 30 to lie opposite to one another.

Figure 14:
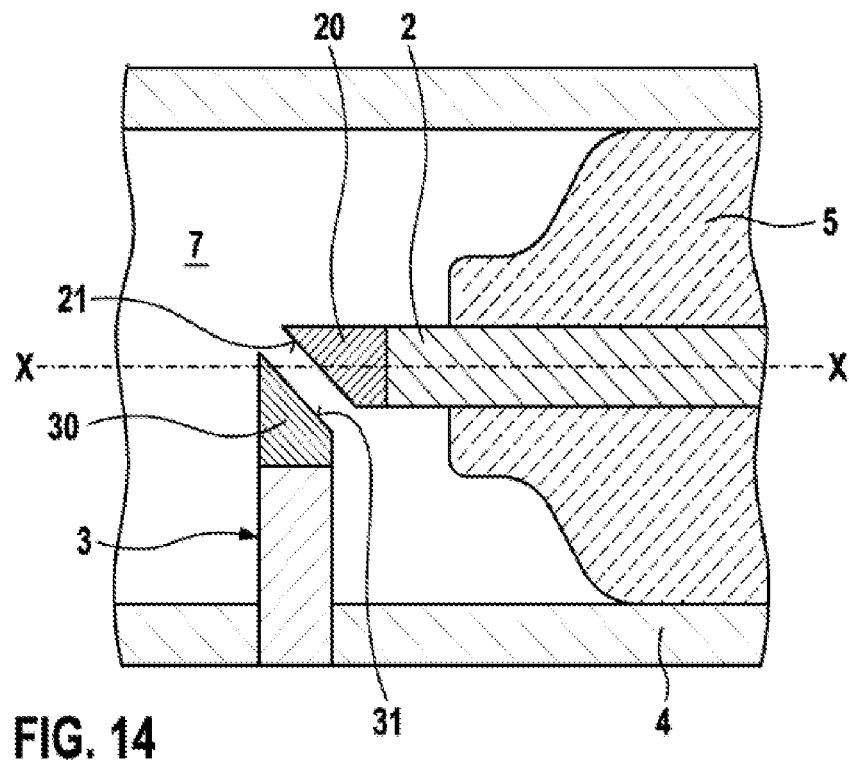

FIG. 14 shows a pre-chamber spark plug 1 according to a tenth embodiment example of the disclosure. Identical or functionally identical parts bear the same reference numbers. Similar to the sixth embodiment example, the tenth embodiment example is provided with slopes on the first end spark face 21 of the first noble metal body 20 and the second end spark face 31 of the second noble metal body 30. The first and second end spark faces 21, 31 are arranged at an acute angle to the center axis X-X of the pre-chamber spark plug, preferably at a 45° angle. As can be seen from FIG. 14, the ground electrode 3 is arranged perpendicular to the middle electrode 2. This configuration can in particular reduce an axial length of the pre-chamber spark plug.

Figure 15:
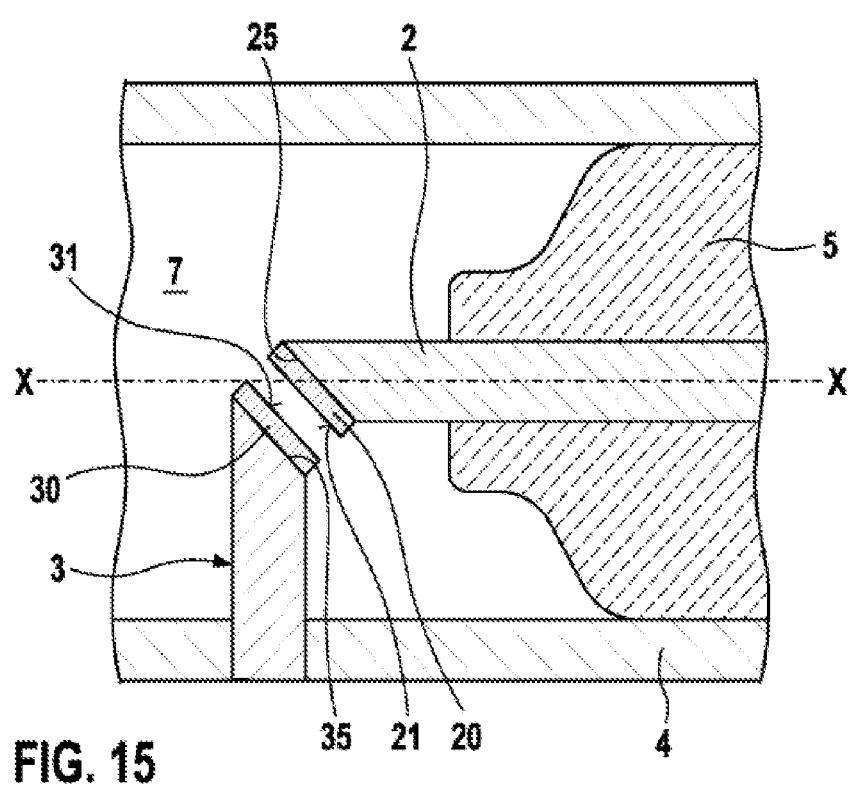

FIG. 15 shows a pre-chamber spark plug 1 according to an eleventh embodiment example of the disclosure. Identical or functionally identical parts again bear the same reference numbers. The eleventh embodiment example is similar to the tenth embodiment example, wherein, by contrast to the tenth embodiment example, the first noble metal body 20 and the second noble metal body 30 are cylindrical. However, a first slope 25 is provided on the middle electrode 2, and a second slope 35 is provided on the ground electrode 3. Similar to the tenth embodiment example, this results in the angular arrangement of the spark faces 21, 31 of the two noble metal bodies 20, 30 relative to the center axis X-X. Otherwise, this embodiment example corresponds to the preceding embodiment examples, such that reference can be made to the description given therein.

For all illustrated embodiment examples, it is noted that laser welding or electron beam welding or resistance welding is preferred as the preferred method of connection for the noble metal bodies 20, 30 on the middle electrode 2 and the ground electrode 3, respectively. The noble metal of the noble metal bodies 20, 30 can be alloys comprising the elements Pt, Ir, Rh, Re. The noble metal bodies 20, 30 can have any geometric shapes, but are preferably cylindrical pins or pads. The respective diameters of the noble metal bodies 20, 30 are selected as a function of the diameters of the electrodes used or are chosen to be as material-saving as possible.

It is further noted that the pre-chamber spark plugs 1 shown in the embodiment examples are preferably provided for automotive applications, in particular with an outer housing diameter of M8, M10, or M12. However, it is also possible that the pre-chamber spark plugs shown can be used on stationary combustion engines with an external thread diameter of, for example, M18.

The invention claimed is:

1. A pre-chamber spark plug, comprising:
a housing extending along a longitudinal axis;
a middle electrode with a first noble metal body, which has a first end spark face, the middle electrode extending along the longitudinal axis within the housing;
a ground electrode with a second noble metal body, which has a second end spark face, the ground electrode fixed within a through hole extending through the housing laterally with respect to the longitudinal axis;
an insulator within the housing which electrically insulates the middle electrode with respect to the ground electrode; and
a cap, which together with a part of the housing, defines a pre-chamber,
wherein the first end spark face and the second end spark face are arranged oppositely at a distance from one another,
wherein the first noble metal body is arranged on a retaining element which is connected to the middle electrode, and
wherein the retaining element is configured as a ring comprising a middle opening in which the middle electrode is arranged.

2. The pre-chamber spark plug according to claim 1, wherein:
the first noble metal body is arranged laterally on the middle electrode, and
the first end spark face is parallel to the longitudinal axis of the pre-chamber spark plug.

3. The pre-chamber spark plug according to claim 1, wherein the second noble metal body is arranged on a lateral flat section of the ground electrode and the first noble metal body is arranged on an end side of the middle electrode.

4. The pre-chamber spark plug according to claim 1, wherein:
the middle electrode comprises on its end side a slope on which the first noble metal body is arranged,
the slope is arranged at a first angle to the center axis of the pre-chamber spark plug,
the ground electrode is arranged at a second angle to the center axis, and
the second noble metal body is arranged on an end side of the ground electrode.

5. The pre-chamber spark plug according to claim 1, wherein the retaining element comprises on the outer circumference a lateral flat section to which the first noble metal body is attached.

6. The pre-chamber spark plug according to claim 1, wherein at least one of the middle electrode and the retaining element comprises a shoulder aligned with the other of the at least one of the retaining element and the middle electrode.

7. The pre-chamber spark plug according to claim 1, wherein the first noble metal body and the second noble metal body have shapes which are identical.

8. The pre-chamber spark plug according claim 1, wherein the first noble metal body and/or the second noble metal body is a cylindrical pin.

9. The pre-chamber spark plug according to claim 1, wherein the first end spark face and the second end spark face are arranged at an acute angle in relation to the center axis of the pre-chamber spark plug.

10. The pre-chamber spark plug according to claim 2, wherein the first noble metal body is arranged in a lateral blind hole in the middle electrode.

11. The pre-chamber spark plug according to claim 4, wherein the first angle is in a range from 30° to 60°.

12. The pre-chamber spark plug according to claim 9, wherein:
   a first slope is formed on the first noble metal body and a second slope is formed on the second noble metal body, or
   the first noble metal body and the second noble metal body are each cylindrical, and a first slope is formed on the middle electrode and a second slope on the ground electrode.

* * * * *